(12) United States Patent
Kwon

(10) Patent No.: US 7,688,713 B2
(45) Date of Patent: Mar. 30, 2010

(54) CHANGING MODE IN DIGITAL BROADCAST RECEIVER

(75) Inventor: Hung-Rok Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1184 days.

(21) Appl. No.: 11/262,918

(22) Filed: Nov. 1, 2005

(65) Prior Publication Data
US 2006/0095951 A1    May 4, 2006

(30) Foreign Application Priority Data
Nov. 4, 2004   (KR) ............... 10-2004-0089502

(51) Int. Cl.
*H04N 7/173* (2006.01)
(52) U.S. Cl. .................. 370/216; 370/255; 725/111
(58) Field of Classification Search ............ 370/216, 370/252, 254, 255, 466; 725/100, 110, 111
See application file for complete search history.

(56) References Cited

U.S. PATENT DOCUMENTS 6,839,829 B1 * 1/2005 Daruwalla et al. ............ 712/28
2005/0286486 A1 * 12/2005 Miller ..................... 370/351
2005/0289618 A1 * 12/2005 Hardin ..................... 725/95
2006/0059391 A1 * 3/2006 Park ....................... 714/48
2006/0085833 A1 * 4/2006 Kwon ..................... 725/111

OTHER PUBLICATIONS

DOCSIS Set-top Gateway (DSG) Interface Specification: Document Control No. CM-SP-DSG-I02-040804.*

* cited by examiner

*Primary Examiner*—Kevin C Harper
*Assistant Examiner*—Mon Cheri S Davenport
(74) *Attorney, Agent, or Firm*—H.C. Park & Associates, PLC

(57) ABSTRACT

A method of changing between a Data over Cable Service Interface Specifications (DOCSIS) mode and a DOCSIS Set-top box Gateway (DSG) mode in a digital broadcast receiver, includes: performing channel searching to change into the DSG mode, and detecting a cause of a failure in securing a channel via a database upon failing to secure the channel in response to a user requesting a change of mode via a host; and recovering the DSG mode as a result of detecting the failure cause upon receiving DSG data. It is therefore possible to change from the DOCSIS mode to the DSG mode according to the state of the OpenCable digital broadcast receiver, thereby improving its capability of coping with a field.

15 Claims, 6 Drawing Sheets

CHANGING MODE IN DIGITAL BROADCAST RECEIVER

CLAIM OF PRIORITY

This application makes reference to, incorporates the same herein, and claims all benefits accruing under 35 U.S.C. §119 from an application for APPARATUS AND METHOD FOR CHANGING MODE DIGITAL BROADCASTING RECEIVER earlier filed in the Korean Intellectual Property Office on 4 Nov. 2004 and there duly assigned Serial No. 2004-89502.

BACKGROUND OF THE INVENTION

1. Field of the Invention

The present invention relates generally to an apparatus and method of changing between a Data Over Cable Service Interface Specifications (DOCSIS) mode and a DOCSIS Set-top box Gateway (DSG) mode in a digital broadcast receiver and, more particularly, to an apparatus and method of changing a mode in a digital broadcast receiver, capable of smoothly changing between a DOCSIS mode and a DSG mode in the broadcast receiver.

2. Description of the Related Art

In general, DOCSIS, as a standard interface of a cable modem for processing input and output of data (signals) between a cable television operator and a personal or business computer or television set, is known now as "CableLabs Certified Cable Modem." DOCSIS 1.0 was ratified by the International Telecommunication Union (ITU-TS) in March of 1998.

Cable modems conforming to DOCSIS are now being marketed. However, cable operators can support their existing customers who have non-standard cable modems by adding a backwards-compatible DOCSIS card in order to handle their existing customers. As DOCSIS continues to evolve into new versions, users of the existing modems can upgrade DOCSIS to the newer versions by changing the program of the Electrically Eraseable Programmable Read-only Memory (EEPROM) in the cable modem. The cable modems supporting DOCSIS show a tendency to be integrated into set-top boxes for use with television sets, and must also support high definition television. The set-top box itself follows a standard known as OpenCable.

DSG is a transmission standard for supporting digital television in the OpenCable standard. DSG is a digital cable television data transmission standard for performing bi-directional communication, which includes performing bi-directional communication for transmission and reception with a service information server, transmission and reception with a conditional access server, and recovery function of uni-directional mode, upstream channel and downstream channel in addition to performing as a data modem through the existing DOCSIS.

Digital broadcasting includes digital terrestrial broadcasting, digital satellite broadcasting, and cable digital broadcasting according to a transmission medium. The current digital satellite broadcasting has be activated all over the world, and is being tested in the United State of America and some countries in Europe.

Digital broadcasting very efficiently compresses an amount of information of channel-specific programs on the basis of a Moving Picture Experts Group (MPEG) coding standard, and very efficiently multiplexes and transmits programs corresponding to a plurality of channels on the basis of transmission medium-specific digital modulation schemes. Thus, digital broadcasting can broadcast several tens to hundreds of channels without using a great deal of repeaters as in analog broadcasting.

A broadcast system for cable digital broadcasting is generally composed of a head end for transmitting a broadcast-related digital signal and receiving and processing data uploaded from a subscriber, and a set-top box for receiving a digital signal transmitted from the head end and converting the received digital signal into an analog signal to thereby reconstitute it into its original audio and video signal.

The head end refers to a main control center equipped with technical equipment capable of a cable television system receiving, creating and re-transmitting a program from a satellite or another place via a system network. The set-top box refers generally to a domestic communication terminal required for multimedia communication services inclusive of video-on-demand services.

With this configuration of the broadcast system, each System Operator (SO) creates programs, contents and other data of the cable television, or is supplied with them from creators to then transmit them to subscribers. The subscribers can watch their desired broadcast after looking at the programs or the other data transmitted from the SO.

Video and audio compression technology for use in the cable digital broadcasting employs MPEG-2 as a standard in the world. Its modulation scheme employs one digital modulation scheme, namely a Quadrature Amplitude Modulation (QAM) scheme capable of changing an amplitude and a phase according to a digital data signal to be transmitted, which is suitable for higher-efficiency transmission of data within a limited transmission band. In particular, 64-state QAM digital frequency modulation technology is mainly used to transmit downstream data on a coaxial cable network, and supports a maximum data rate of 28 Mbps on a single 6-MHz channel.

Most technologies used in cable broadcasting are used for digital television. One difference between them is that digital television technology makes use of a wireless transmission medium while cable television broadcasting makes use of a wired transmission medium. Thus, cable broadcasting has an advantage in that it is better than the terrestrial broadcasting in bi-directional services.

The digital broadcast receiver, such as a set-top box, for digital broadcasting is a device which is mainly directed to deciphering digitalized broadcasts and management information transmitted from the head end, which is installed at a local cable television firm, for the cable television or modem services provided to the subscribers and transmitting analog signals to television receivers. The digital broadcast receiver receives the broadcast and management information from the head end, such as an audio-video server, a service information server for transmitting and receiving broadcast channel information, or a conditional access server.

The cable digital broadcast receiver for cable digital broadcasting based on the cable network includes a cable modem in many cases. The cable modem is a device for converting an analog signal into a digital signal so as to make high-speed Internet service available through a cable network. The name "modem" is proper because the cable network is an analog network like a telephone network. The telephone network is made up of copper wires, and the cable network is made up of coaxial cables or optical cables. Accordingly, the cable network has a much wider bandwidth than the telephone network. However, the cable network requires modulation and demodulation technology for converting digital into analog, and vice versa when transmitting data. It is the cable modem that is being developed to support this.

The cable digital broadcast receiver including the cable modem in cable digital broadcasting is basically composed of a plurality of broadcast channels and a single modem channel. The broadcast channel and the modem channel are distinguished by a physical frequency, and cannot overlap each other, so that they have a reciprocal exclusive relationship. Information on the broadcast channels is managed by Service Information (SI), while information on the modem channel is adapted to find its own channel via a self search process.

A cable digital broadcast system generally has a structure where a local cable broadcast station and a subscriber side are generally connected through a cable network. Subscriber-side equipment includes a cable digital broadcast receiver having a cable modem, a television (TV) receiver, etc., and local cable broadcast-side equipment includes an SI server for transmitting broadcast channel information, a CA (Conditional Access) server, a Cable Modem Termination System (CMTS), an audio-video server, a broadcast head end, etc.

Data transmitted from the local cable broadcast station to the subscriber-side equipment includes additional information such as broadcast program information except video and audio signals, and are transmitted in packets. The cable digital broadcast receiver receiving this information processes broadcast signals received by the TV receiver and by the cable broadcast station, and converts them into analog signals capable of being recognized by the TV receiver.

Hereinafter, the equipment located at the local cable broadcast station will be described first.

Devices associated with Internet signals are the CMTS, the CA server, and the SI server. These devices are interconnected via an Internet Protocol (IP) network.

The CMTS is a cable modem head end, which is device for converting data of a cable modem into an Internet data packet. The CMTS provides some functions including routing for storing local data in the cable system, filtering for protecting a cable operator from undesired hacking and traffic embodying for guaranteeing a Quality of Service (QoS) to the subscriber.

The SI server transmits channel information of the cable broadcast, program map information, event information to the subscriber side, and the CA server permits access to a specific service or content only to an authenticated user.

The devices associated with the broadcast signals include the audio-video server and the broadcast head end.

The audio-video server compresses and digitizes MPEG audio and video signals and transmits them to a subscriber-side MPEG(Host) via the broadcast head end.

The broadcast head end refers to a main control center having technical equipment for receiving, creating and re-transmitting programs from the audio-video server via the network.

The local broadcast station side constituting the above-mentioned devices communicates with the cable digital broadcast receiver, adopting the CMTS and the broadcast head end as terminal points for connecting to the network.

In the case of communication between the cable digital broadcast receiver and the subscriber side, there is a signal stream from the CMTS to the subscriber side, and vice versa. In other words, communication between the cable digital broadcast receiver and the subscriber side is bi-directional.

In contrast, in the broadcast head end, there is a signal stream from the broadcast head end to the subscriber side, but not in reverse. The broadcast head end is characterized by uni-directional communication.

Equipment required to watch the cable digital broadcast on the premise includes the cable digital broadcast receiver.

The cable digital broadcast receiver is essentially composed of the cable modem, the MPEG(Host) and so forth.

The cable modem makes it possible to connect a Personal Computer (PC) to a cable TV line and receive data at a maximum data rate of 10 Mbps or so. When the cable modem is installed together with the set-top box, it is possible to watch the television. All of the cable modems should be connected to a coaxial cable of the cable television firm in to communicate with the CMTS of each local cable broadcast station. Each cable modem can transmit and receive data with respect to only the CMTS, but it cannot exchange signals with the other cable modems connected to the same line. The real bandwidth of the cable TV line for Internet services is a maximum of 27 Mbps or so downstream (from the broadcast station to the subscriber side) and 2.5 Mbps or so upstream (from subscriber side to the broadcast station).

The cable modem function of the cable digital broadcast receiver enables the Internet services of the PC of a user by connection to the user PC, and is used as a return path of a conditional access device which the cable digital broadcast receiver includes, thereby being used as a path for communicating with the CA server. When the cable digital broadcast receiver has a built-in data broadcast application, it is used as the communication path of bi-directional data broadcasting.

A standard for the cable modem is originally made to utilize a cable television network, which has been already established, to provide the Internet services. The cable network installed by each communication company supports a maximum bandwidth of 750 MHz, wherein an upstream channel and a downstream channel are used one by one. Furthermore, a frequency band uses 6 MHz per channel.

Among them, the upstream channel mainly uses a Quadrature Phase Shift Keying (QPSK) scheme, while the downstream channel mainly uses a Quadrature Amplitude Modulation (QAM) scheme. The downstream channel uses about a maximum of 30 Mbps with a 64 QAM scheme that is widely used at present. The upstream channel uses 10 Mbps when using all of the 6 MHz bandwidths. However, the upstream channel does not use all of the 6 MHz bandwidths, but rather uses about 2.4 Mbps due to noise or other various influences. Because of this noise, the upstream channel is slower than the downstream channel. In order to protect the network equipment from the noise generated by devices installed at each home, the QPSK scheme, which is capable of reducing the noise a bit more, is used. By contrast, the downstream channel uses the QAM scheme because speed is important.

The MPEG (Host) demodulates video and audio data from the received MPEG data to enable a video and audio processor to process the demodulated data, wherein broadcast program information as additional information from the MPEG data is demodulated and transmitted to a Central Processing Unit (CPU).

The overall operation of the cable modem is as follows.

First, a frequency of a channel used for downloading is scanned. When being turned on, the cable modem automatically finds the frequency used for uploading and downloading. The frequency is different according to a cable modem operator. When the frequency is found, it is locked to the corresponding channel.

After searching and locking the frequency, the cable modem receives data containing contents of the channel used for uploading, or an Upstream Channel Descriptor (UCD), and communicates with an external network using this information. When the cable modem fails to receive the UCD, it makes an attempt at upstream channel recovery after setting a DSG unidirectional mode.

The cable modem then checks the intensity (referred to as a "level") of a signal being transmitted on uploading. When setting of the channels used for uploading and downloading is completely terminated, the cable modem provides access to a Dynamic Host Configuration Protocol (DHCP) server and is assigned an IP address and a gateway address. The cable modem reserves the assigned addresses and then transmits them to a LAN card of the PC.

A server supplies the cable modem assigned the IP address with a 'configuration file' which contains various information required for operation other than frequency information. The cable modem uses a protocol known as Trivial File Transfer Protocol (TFTP). The configuration file is different for each cable modem. Cable modem operators can restrict uploading and downloading speeds by using the configuration file.

The DHCP server leases the IP address to the cable modem on the basis of a preset time period (e.g., 24 hours, 12 hours, 1 hour, etc.). When the cable modem is still being used after the preset time has elapsed, the cable modem is allowed to continue to use the leased IP address. In order to calculate this time, the cable modem is supplied with a current time from a server, wherein the server is the DHCP server for the most part. When the IP address is not assigned from the DHCP server, the cable modem makes an attempt at a DSG unidirectional mode.

With a series of processes mentioned above, an environment where users can normally use Internet is set.

In an OpenCable digital broadcast system, the digital broadcast receiver operates in a DOCSIS mode as soon as the system begins to operate.

Then, when an instruction of a DSG mode is issued from a user host, the digital broadcast receiver attempts to operate in the DSG mode.

In other words, a process of searching the channel is performed for digital broadcasting. When all the channel searching processes fail to secure the channel, the digital broadcast receiver runs to the DOCSIS mode after searching the channel.

In the OpenCable digital broadcast system, the digital broadcast receiver is adapted to change the operational mode between the DOCSIS mode and the DSG mode. However, only the minimum requirements are prescribed in the OpenCable digital broadcast system, so that it is impossible to cope with exceptional cases which are generated under real various network environments and broadcast systems.

SUMMARY OF THE INVENTION

It is, therefore, an object of the present invention to provide an apparatus for changing a mode in a digital broadcast receiver, capable of securing the safety of a digital data broadcast by returning into a DOCSIS mode only when DSG data is not being transmitted among factors of failing to search for a channel.

According to an aspect of the present invention, a method of changing modes in a digital broadcast receiver includes: channel searching to change a first mode into a second mode, and detecting a cause of a failure in securing a channel via a database upon failing to secure the channel in response to a user requesting a change of the first mode via a host; and recovering the second mode in response to detecting the cause of failure in securing a channel upon receiving Data over Cable Service Interface Specifications (DOCSIS) set-top box gateway data.

According to another aspect of the present invention, a method of changing modes in a digital broadcast receiver includes: channel searching to change from a Data over Cable Service Interface Specifications (DOCSIS) mode into a DOCSIS Set-top box Gateway (DSG) mode, and detecting a cause of a failure in securing a channel via a database upon failing to secure the channel in response to a user requesting a change of mode via a host; and recovering the DSG mode as a result of detecting the failure in securing a channel upon receiving DSG data.

The method preferably further includes remaining in the DOCSIS mode as a result of detecting the failure in securing a channel upon not receiving DSG data.

Channel searching to change from a Data over Cable Service Interface Specifications (DOCSIS) mode into a DOCSIS Set-top box Gateway (DSG) mode, and detecting a cause of a failure in securing a channel via a database upon failing to secure the channel in response to a user requesting a change of mode via a host preferably includes: determining whether or not the failure is a Quadrature Amplitude Modulation (QAM) looking failure; and re-attempting the channel searching and simultaneously maintaining the DSG mode upon a determination that the failure is the QAM looking failure.

The method preferably further includes: determining whether or not the failure is a Phase Locked Loop (PLL) looking failure upon a determination that the failure is not the QAM looking failure; and re-attempting the channel searching and simultaneously maintaining the DSG mode upon a determination that the failure is the PLL looking failure.

The method preferably further includes: determining whether or not the failure is a failure of synchronization between a Cable Modem Termination System (CMTS) and a cable modem upon a determination that the failure is not the PLL looking failure; and re-attempting the channel searching and simultaneously maintaining the DSG mode upon a determination that the failure is the synchronization failure.

The method preferably further includes: determining whether or not the failure is a failure in receiving the DSG data upon a determination that the failure is not the synchronization failure.

Remaining in the DOCSIS mode as a result of detecting the failure in securing a channel upon not receiving DSG data preferably includes performing the channel searching again by a cable modem upon receiving the DSG data from a Cable Modem Termination System (CMTS) while operating in the DOCSIS mode.

According to another aspect of the present invention, a digital broadcast receiver in an OpenCable digital broadcast system includes: a cable modem adapted to search upstream and downstream channels of a Cable Modem Termination System (CMTS) upon a user requesting a change of mode via a host, and to determine whether to receive Data over Cable Service Interface Specifications (DOCSIS) set-top box gateway data in a first mode to change into one of first and second modes according to whether or not securing the channels has succeeded.

According to yet another aspect of the present invention, a digital broadcast receiver in an OpenCable digital broadcast system includes: a cable modem adapted to search upstream and downstream channels of a Cable Modem Termination System (CMTS) upon a user requesting a change of a Data over Cable Service Interface Specifications (DOCSIS) Set-top box Gateway (DSG) mode via a host, and to determine whether to receive DSG data in a DOCSIS mode to change into one of DSG and DOCSIS modes according to whether or not securing the channels has succeeded.

The cable modem preferably includes: a channel searcher adapted to search the upstream and downstream channels of the CMTS upon the user requesting the change of mode via the host; and a mode changer adapted to determine whether to receive the DSG data in the DOCSIS mode, and to change into the DSG mode upon the channel searcher succeeding in securing the channels, and to change into the DOCSIS mode upon the channel searcher failing to secure the channels.

The digital broadcast receiver preferably further includes a database adapted to store conditions of failing to search the channels in accordance with the channel searching failure of the channel searcher.

The mode changer preferably includes: a detector adapted to detect a factor of failing to secure the channels via a database upon failing to secure the channels in the DOCSIS mode; and a recover adapted to re-attempt channel searching and to simultaneously maintain the DSG mode upon the factor of failing to secure the channels being a physical factor, and to maintain the DOCSIS mode upon the DSG data not being received.

The digital broadcast receiver preferably further includes an address register adapted to register a Media Access Control (MAC) address with the CMTS upon the DSG mode being recovered via the recover.

According to yet another aspect of the present invention, an OpenCable digital broadcast system includes: a Cable Modem Termination System (CMTS) adapted to receive Data over Cable Service Interface Specifications (DOCSIS) Set-top box Gateway (DSG) data from one of a service information server and a conditional access server and to transmit the DSG data; a cable modem adapted to determine, upon failing to secure a channel of the CMTS, whether or not the DSG data has been received and to perform a DOCSIS mode only upon the DSG data not being received, and to perform a DSG mode upon the DSG data being received after failing to secure the channel of the CMTS; and multiple DSG channels each having a broadcast head end adapted to receive, create and re-transmit programs from a digital broadcast server via a network in the DSG mode.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

Figure 1:
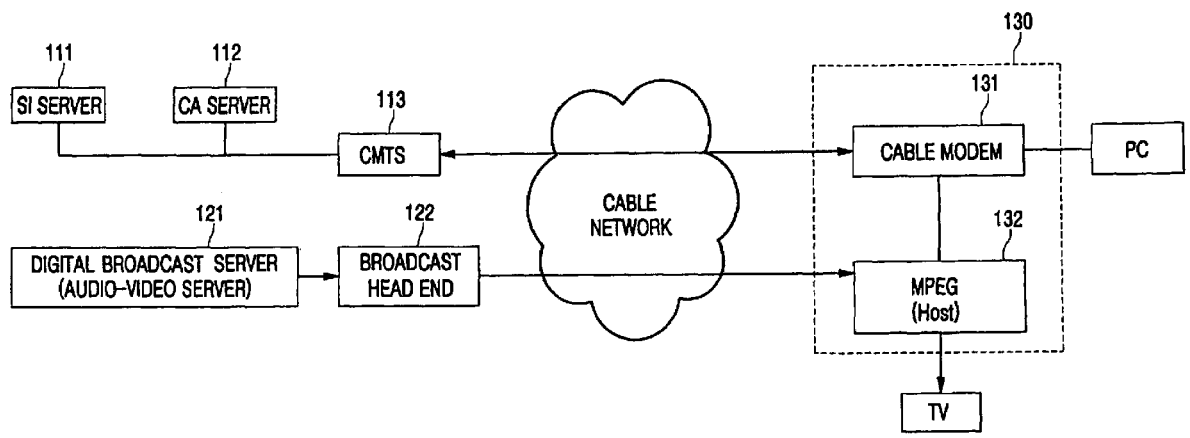
FIG. 1 is a functional block diagram of an apparatus to change a mode in a digital broadcast receiver.

FIG. 1 is a functional block diagram of an apparatus to change a mode in a digital broadcast receiver. The cable digital broadcast system generally has a structure where a local cable broadcast station and a subscriber side are generally connected through a cable network. Subscriber-side equipment includes a cable digital broadcast receiver 130 having a cable modem, a television (TV) receiver, etc., and local cable broadcast-side equipment includes an SI server 111 for transmitting broadcast channel information, a CA (Conditional Access) server 112, a Cable Modem Termination System (CMTS) 113, an audio-video server 121, a broadcast head end 122, etc.

Data transmitted from the local cable broadcast station to the subscriber-side equipment includes additional information such as broadcast program information except video and audio signals, and are transmitted in packets. The cable digital broadcast receiver 130 receiving this information processes broadcast signals received by the TV receiver and by the cable broadcast station, and converts them into analog signals capable of being recognized by the TV receiver.

Hereinafter, the equipment located at the local cable broadcast station will be described first.

Devices associated with Internet signals are the CMTS 113, the CA server 112, and the SI server 111. These devices are interconnected via an Internet Protocol (IP) network.

The CMTS 113 is a cable modem head end, which is device for converting data of a cable modem 131 into an Internet data packet. The CMTS 113 provides some functions including routing for storing local data in the cable system, filtering for protecting a cable operator from undesired hacking and traffic embodying for guaranteeing a Quality of Service (QoS) to the subscriber.

The SI server 111 transmits channel information of the cable broadcast, program map information, event information to the subscriber side, and the CA server 112 permits access to a specific service or content only to an authenticated user.

The devices associated with the broadcast signals include the audio-video server 121 and the broadcast head end 122.

The audio-video server 121 compresses and digitizes MPEG audio and video signals and transmits them to a subscriber-side MPEG(Host) 132 via the broadcast head end 122.

The broadcast head end 122 refers to a main control center having technical equipment for receiving, creating and re-transmitting programs from the audio-video server 121 via the network.

The local broadcast station side constituting the above-mentioned devices communicates with the cable digital broadcast receiver 130, adopting the CMTS 113 and the broadcast head end 122 as terminal points for connecting to the network.

In the case of communication between the cable digital broadcast receiver 130 and the subscriber side, there is a signal stream from the CMTS 113 to the subscriber side, and vice versa. In other words, communication between the cable digital broadcast receiver 130 and the subscriber side is bi-directional.

By contrast, in the broadcast head end 122, there is a signal stream from the broadcast head end 122 to the subscriber side, but not in reverse. The broadcast head end 122 is characterized by uni-directional communication.

Equipment required to watch the cable digital broadcast on the premise includes the cable digital broadcast receiver 130.

The cable digital broadcast receiver 130 is essentially composed of the cable modem 130, the MPEG(Host) 132 and so forth.

The cable modem 131 makes it possible to connect a Personal Computer (PC) to a cable TV line and receive data at a maximum data rate of 10 Mbps or so. When the cable modem 131 is installed together with the set-top box, it is possible to watch the television. All of the cable modems 131 should be connected to a coaxial cable of the cable television firm in to communicate with the CMTS 113 of each local cable broadcast station. Each cable modem 131 can transmit and receive data with respect to only the CMTS 113, but it cannot exchange signals with the other cable modems connected to the same line. The real bandwidth of the cable TV line for Internet services is a maximum of 27 Mbps or so downstream (from the broadcast station to the subscriber side) and 2.5 Mbps or so upstream (from subscriber side to the broadcast station).

The cable modem function of the cable digital broadcast receiver 130 enables the Internet services of the PC of a user by connection to the user PC, and is used as a return path of a conditional access device which the cable digital broadcast receiver 130 includes, thereby being used as a path for communicating with the CA server. When the cable digital broadcast receiver 130 has a built-in data broadcast application, it is used as the communication path of bi-directional data broadcasting.

A standard for the cable modem 131 is originally made to utilize a cable television network, which has been already established, to provide the Internet services. The cable network installed by each communication company supports a maximum bandwidth of 750 MHz, wherein an upstream channel and a downstream channel are used one by one. Furthermore, a frequency band uses 6 MHz per channel.

Among them, the upstream channel mainly uses a Quadrature Phase Shift Keying (QPSK) scheme, while the downstream channel mainly uses a Quadrature Amplitude Modulation (QAM) scheme. The downstream channel uses about a maximum of 30 Mbps with a 64 QAM scheme that is widely used at present. The upstream channel uses 10 Mbps when using all of the 6 MHz bandwidths. However, the upstream channel does not use all of the 6 MHz bandwidths, but rather uses about 2.4 Mbps due to noise or other various influences. Because of this noise, the upstream channel is slower than the downstream channel. In order to protect the network equipment from the noise generated by devices installed at each home, the QPSK scheme, which is capable of reducing the noise a bit more, is used. By contrast, the downstream channel uses the QAM scheme because speed is important.

The MPEG (Host) 132 demodulates video and audio data from the received MPEG data to enable a video and audio processor (not shown) to process the demodulated data, wherein broadcast program information as additional information from the MPEG data is demodulated and transmitted to a Central Processing Unit (CPU) (not shown).

The overall operation of the cable modem 131 is as follows.

First, a frequency of a channel used for downloading is scanned. When being turned on, the cable modem 131 automatically finds the frequency used for uploading and downloading. The frequency is different according to a cable modem operator. When the frequency is found, it is locked to the corresponding channel.

After searching and locking the frequency, the cable modem 131 receives data containing contents of the channel used for uploading, or an Upstream Channel Descriptor (UCD), and communicates with an external network using this information. When the cable modem fails to receive the UCD, it makes an attempt at upstream channel recovery after setting a DSG uni-directional mode.

The cable modem 131 then checks the intensity (referred to as a "level") of a signal being transmitted on uploading. When setting of the channels used for uploading and downloading is completely terminated, the cable modem 131 provides access to a Dynamic Host Configuration Protocol (DHCP) server and is assigned an IP address and a gateway address. The cable modem 131 reserves the assigned addresses and then transmits them to a LAN card of the PC.

A server supplies the cable modem 131 assigned the IP address with a 'configuration file' which contains various information required for operation other than frequency information. The cable modem 131 uses a protocol known as Trivial File Transfer Protocol (TFTP). The configuration file is different for each cable modem. Cable modem operators can restrict uploading and downloading speeds by using the configuration file.

The DHCP server leases the IP address to the cable modem on the basis of a preset time period (e.g., 24 hours, 12 hours, 1 hour, etc.). When the cable modem is still being used after the preset time has elapsed, the cable modem is allowed to continue to use the leased IP address. In order to calculate this time, the cable modem is supplied with a current time from a server, wherein the server is the DHCP server for the most part. When the IP address is not assigned from the DHCP server, the cable modem makes an attempt at a DSG uni-directional mode.

With a series of processes mentioned above, an environment where users can normally use Internet is set.

In an OpenCable digital broadcast system, the digital broadcast receiver operates in a DOCSIS mode as soon as the system begins to operate.

Then, when an instruction of a DSG mode is issued from a user host, the digital broadcast receiver attempts to operate in the DSG mode.

In other words, a process of searching the channel is performed for digital broadcasting. When all the channel searching processes fail to secure the channel, the digital broadcast receiver runs to the DOCSIS mode after searching the channel.

In the OpenCable digital broadcast system, the digital broadcast receiver is adapted to change the operational mode between the DOCSIS mode and the DSG mode. However, only the minimum requirements are prescribed in the OpenCable digital broadcast system, so that it is impossible to cope with exceptional cases which are generated under real various network environments and broadcast systems.

A method of changing between a DOCSIS mode and a DSG mode in an apparatus for changing a mode in a digital broadcast receiver according to a first embodiment of the present invention is described below in more detail with reference to the accompanying drawings.

The digital broadcast system following a standard of OpenCable has a structure where a local cable broadcast station and a subscriber side are generally connected through a cable network, as shown in FIG. 1. Subscriber-side equipment includes a cable digital broadcast receiver 130 having a cable modem, a television (TV) receiver etc., and local cable broadcast-side equipment includes an Service information (SI) server 111 for transmitting broadcast channel information, a Conditional Access (CA) server 112, at least one Cable Modem Termination System (CMTS) 113, an audio-video server 121, a broadcast head end 122, etc.

Data transmitted from the local cable broadcast station to the subscriber-side equipment includes additional information such as broadcast program information other than video and audio signals, and are transmitted in packet units. The cable digital broadcast receiver 130 receiving this information processes broadcast signals received by the TV receiver and the cable broadcast station, and converts them into analog signals capable of being recognized by the TV receiver.

The equipment located at the local cable broadcast station is described first below.

Devices associated with Internet signals are the CMTS 113, the CA server 112, and the SI server 111. These devices are interconnected via an Internet protocol (IP) network.

The at least one CMTS 113 is a cable modem head end, which is device for converting data of a cable modem 131 into Internet data packets. The CMTS 113 provides some functions including routing for storing local data in the cable system, filtering for protecting a cable operator from undesired hacking and traffic embodying for guaranteeing a Quality of Service (QoS) to the subscriber.

The SI server 111 transmits channel information of the cable broadcast, program map information, event information to the subscriber side, and the CA server 112 controls to permit access to a specific service or content only to an authenticated user.

The devices associated with the broadcast signals are the audio-video server 121 and the broadcast head end 122.

The audio-video server 121 compresses and digitizes MPEG audio and video signals, and transmits them to a subscriber-side MPEG (Host) 132 via the broadcast head end 122.

The broadcast head end 122 refers to a main control center having technical equipment for receiving, creating and re-transmitting programs from the audio-video server 121 via the network.

The local broadcast station side constituting the above-mentioned devices communicates with the cable digital broadcast receiver 130 located on the premises by adopting the CMTS 113 and the broadcast head end 122 as terminal points connecting to the network.

In the case of communication between the cable digital broadcast receiver 130 and the subscriber side, there is a signal stream from the CMTS 113 to the subscriber side, and vice versa. In other words, the communication between the cable digital broadcast receiver 130 and the subscriber side is bi-directional.

In contrast, in the case of the broadcast head end 122, there is a signal stream from the broadcast head end 122 to the subscriber side, but not in reverse. The broadcast head end 122 is characterized by uni-directional communication.

Equipment required to watch the cable digital broadcast on the premise is the cable digital broadcast receiver 130.

The cable digital broadcast receiver 130 is essentially composed of the cable modem 130, the MPEG(Host) 132 and so forth.

The cable modem 131 makes it possible to connect a Personal Computer (PC) to a cable TV line and to receive data at a maximum data rate of 10 Mbps. When the cable modem 131 is installed together with the set-top box, it is possible to watch the television. All the cable modems 131 should be connected to a coaxial cable of a cable TV firm in order to communicate with the CMTS 113 of each local cable broadcast station. Each cable modem 131 can transmit and receive data with respect to only the CMTS 113, but it cannot exchange signals with the other cable modems connected to the same line. A real bandwidth of the cable TV line for Internet services is a maximum of 27 Mbps downstream (from the broadcast station to the subscriber side) and 2.5 Mbps upstream (from subscriber side to the broadcast station).

The cable modem function of the cable digital broadcast receiver 130 enables the Internet services of the PC of a user by connection with the user PC, and is used as a return path of a conditional access device which the cable digital broadcast receiver 130 includes, thereby being used as a path for communicating with the CA server. When the cable digital broadcast receiver 130 has built-in data broadcast application, it is used as the communication path of bi-directional data broadcasts.

A standard for the cable modem 131 is originally made to utilize a cable television network, which has been already established, to provide Internet services. The cable network installed by each communication company supports a maximum of 750 MHz, wherein an upstream channel and a downstream channel are used one by one. Furthermore, a frequency band makes use of 6 MHz per channel.

Among them, the upstream channel mainly uses a Quadrature Phase Shift Keying (QPSK) scheme, while the downstream channel mainly uses a Quadrature Amplitude Modulation (QAM) scheme. The downstream channel uses a maximum of 30 Mbps with a 64 QAM scheme that is widely used at present. The upstream channel uses 10 Mbps when using all of the 6 MHz bandwidths. However, the upstream channel does not use all of the 6 MHz bandwidths, but it uses about 2.4 Mbps due to noise or the other various influences. Because of this noise, the upstream channel is slower than the downstream channel. In order to protect the network equipment from the noise generated from devices installed at each home, the QPSK scheme capable of reducing the noise a bit more is used. In contrast, the downstream channel uses the QAM scheme because speed is important.

The MPEP (Host) 132 demodulates video and audio data among from received MPEG data to have a video and audio processor (not shown) process the demodulated data, wherein broadcast program information as additional information among from the MPEG data is demodulated and transmitted to a central processing unit (CPU) (not shown).

Figure 2:
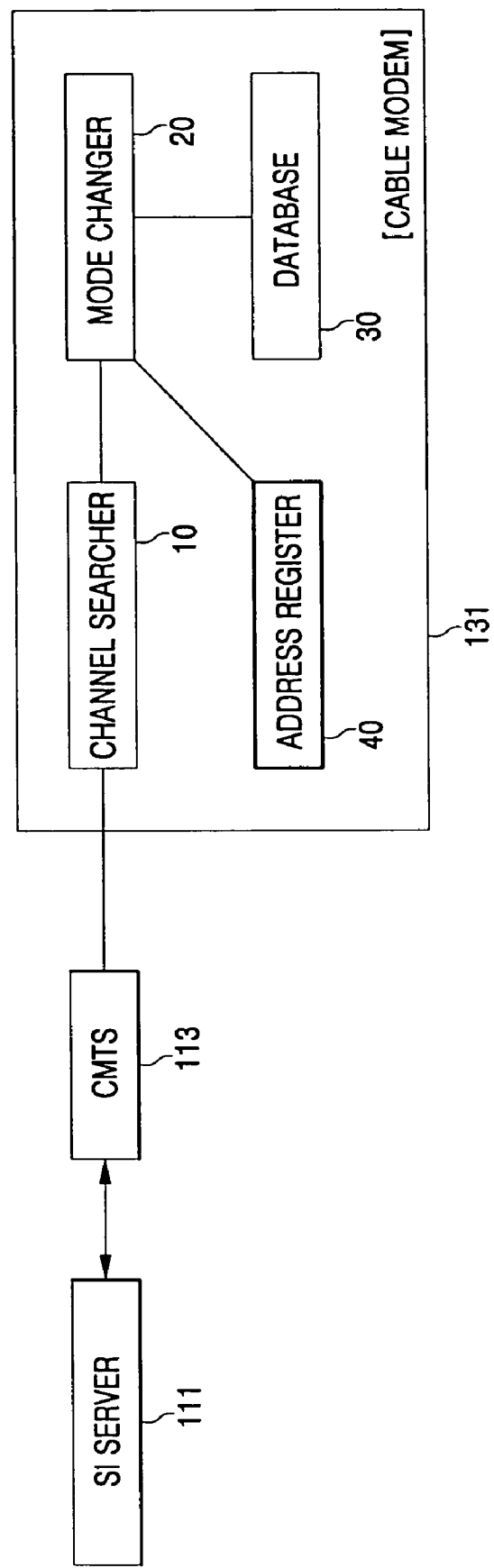
FIG. 2 is a functional block diagram of an apparatus to change a mode in a digital broadcast receiver according to a first embodiment of the present invention.

FIG. 2 is a functional block diagram of an apparatus for changing a mode in a digital broadcast receiver according to a first embodiment of the present invention, wherein the mode changing apparatus in the digital broadcast receiver according to the first embodiment of the present invention includes a cable modem 131.

Figure 3:
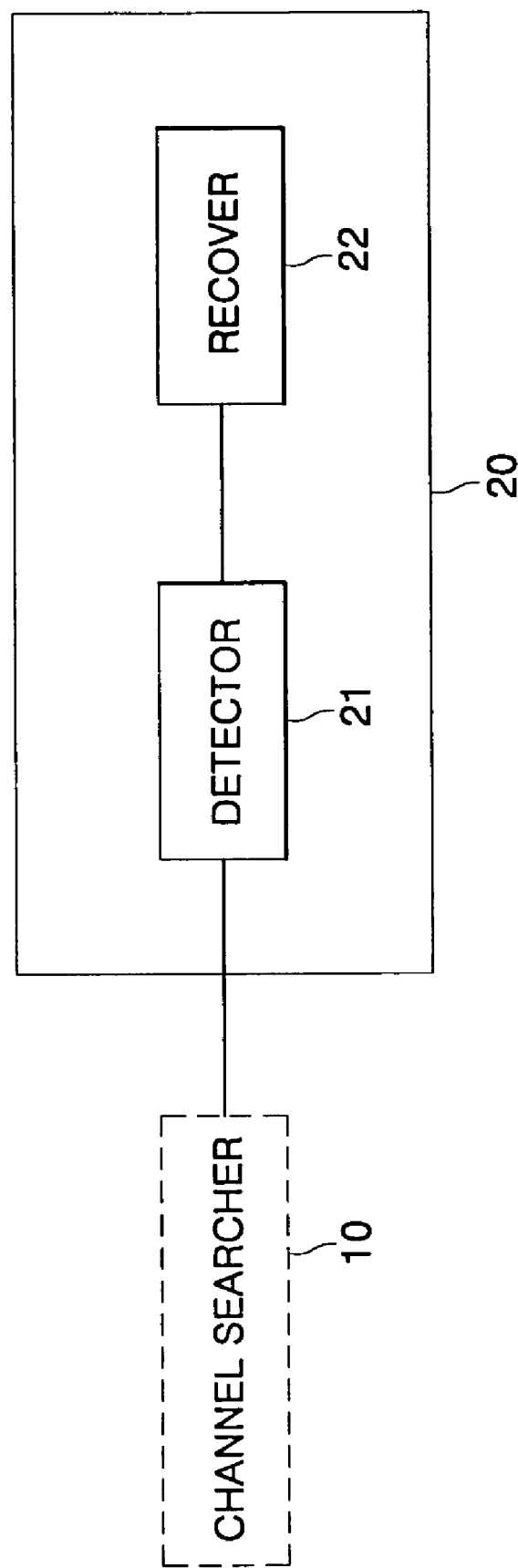
FIG. 3 is a functional block diagram of a mode changer in the apparatus to change a mode in the digital broadcast receiver of FIG. 2.

When a user requests a change of a DSG mode through a host, the cable modem 131 serves not only to search upstream and downstream channels of a CMTS, but also determine whether to receive DSG data in a DOCSIS mode to perform conversion into the DSG mode or the DOCSIS mode based on success in securing a channel. As shown in FIGS. 2 and 3, the cable modem 131 further includes a channel searcher 10, a mode changer 20 having a detector 21 and a recover 22, a database 30 and an address register 40.

The channel searcher 10 of the cable modem 131 searches upstream and downstream channels of the CMTS, when the user requests the change of the DSG mode via the host.

The mode changer 20 of the cable modem 131 not only determines whether to receive the DSG data in the DOCSIS mode, but also performs conversion into the DSG mode when the channel searcher 10 succeeds in securing the channel and into the DOCSIS mode when the channel searcher 10 fails to secure the channel. The mode changer 20 further includes the detector 21 and the recover 22 as shown in FIG. 3.

The detector 21 of the mode changer 20 detects a factor of failing to secure the channel through the database 30, when failing to secure the channel in the DOCSIS mode.

The recover 22 of the mode changer 20 re-attempts to search the channel and simultaneously maintains the DSG mode when the failure factor is a physical factor, and serves to maintain the DOCSIS mode when failing to receive the DSG data.

Furthermore, the database 30 of the cable modem 131 stores conditions of failing to search the channel, wherein the channel searching failure conditions are caused by the failure in searching the channel at the channel searcher 10.

The address register 40 of the cable modem 131 again registers a Media Access Control (MAC) address with the CMTS when again recovering the DSG mode via the recover 22.

Figure 4:
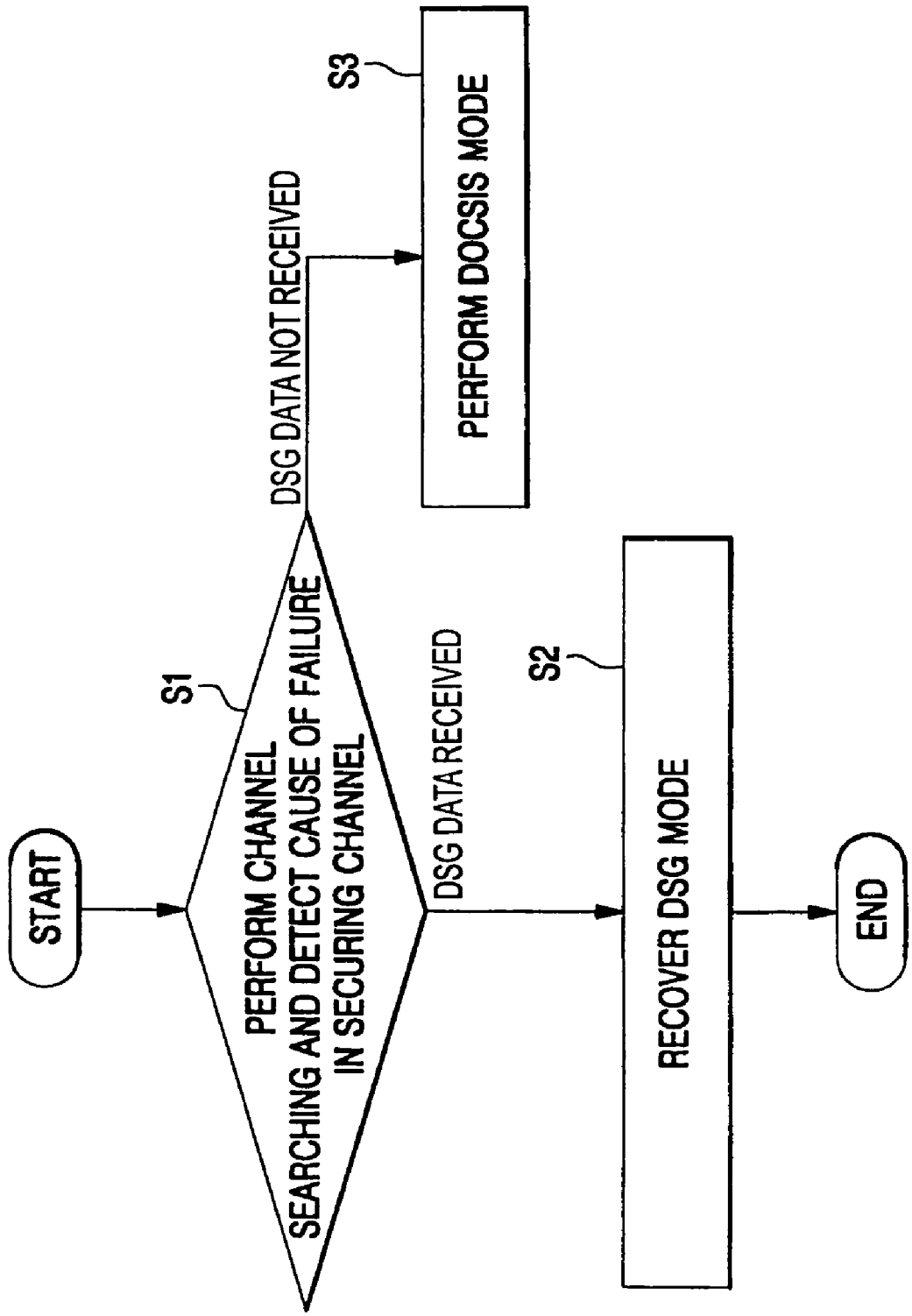
FIG. 4 is a flowchart of a method of changing between a DOCSIS mode and a DSG mode in an apparatus to change a mode in a digital broadcast receiver according to a first embodiment of the present invention.

The mode changing method in the digital broadcast receiver having the abovementioned configuration is described below with reference to FIG. 4.

Figure 6A:
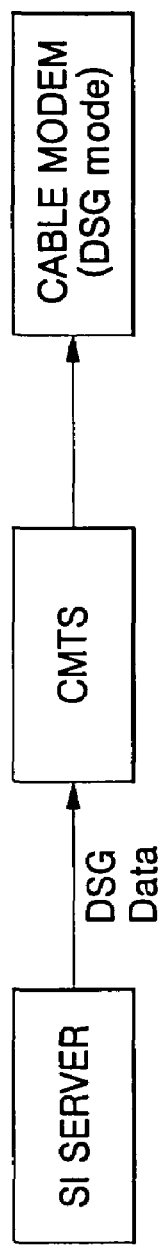
FIG. 6A is a view of a connection of an apparatus to change a mode in the digital broadcast receiver of FIG. 4.

First, the cable modem 131 operates in the DOCSIS mode in the beginning. In other words, as shown in FIG. 6, the cable modem 131, the SI server and the CMTS are interconnected with each other.

When the user requests the change of the DSG mode via the host, the cable modem 131 performs channel searching in order to change into the DSG mode, and detects a channel securing failure cause via the database when failing to secure the channel (S1).

Figure 5:
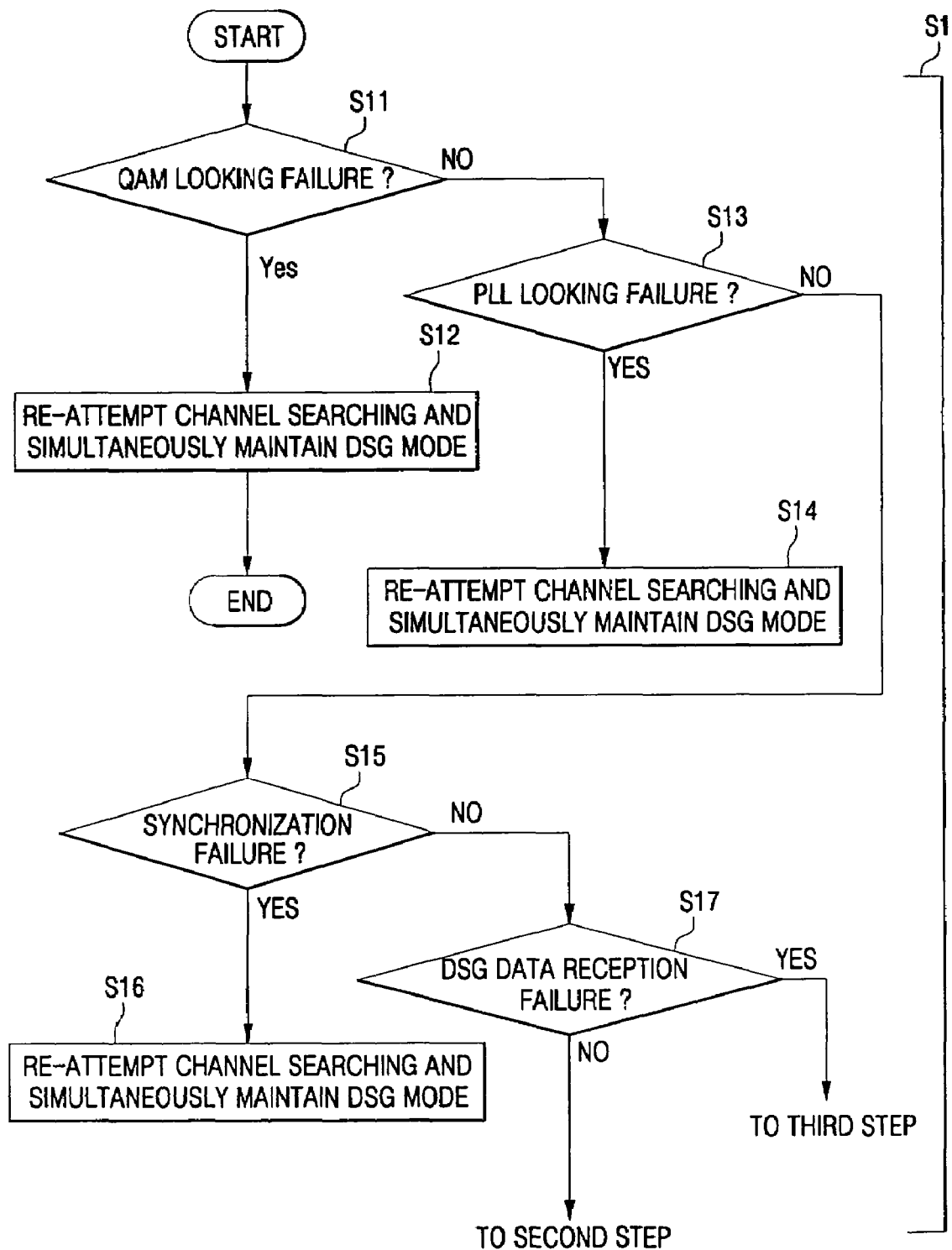
FIG. 5 is a flowchart of a first step S1 of a method for changing between a DOCSIS mode and a DSG mode in an apparatus to change a mode in a digital broadcast receiver according to a first embodiment of the present invention.

A detailed operation of the first step S1 is described below with reference to FIG. 5.

Figure 6B:
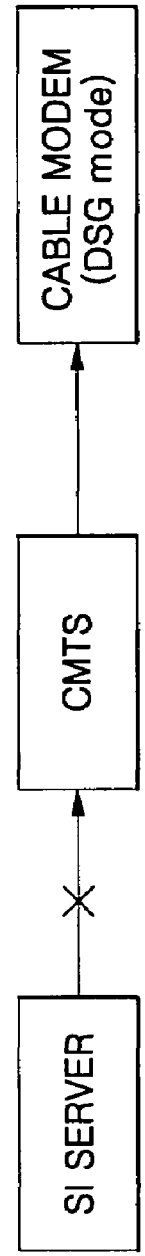
FIG. 6B is a view of a disconnection of an apparatus to change a mode in the digital broadcast receiver of FIG. 4.

Thereafter, when the user requests the change of the DSG mode via the host, the cable modem 131 performs the channel searching. At this time, as shown in FIG. 6B, when the SI server and the CMTS are not connected, the cable modem 131 fails to search the channel. Then, the cable modem 131 determines whether or not the channel searching failure is a QAM looking failure (S11).

When the failure is determined to be the QAM looking failure in the eleventh step S11, the cable modem 131 re-attempts to search the channel and simultaneously maintains the DSG mode (S12). In other words, the cable modem 131 re-attempts to search the channel so as to allow operating in the DOCSIS mode or in the DSG mode.

However, when the failure is determined not to be the QAM looking failure in the eleventh step S11, the cable modem 131 determines whether or not the channel searching failure is a PLL (Phase Locked Loop) looking failure (S13).

When the failure is determined to be the PLL looking failure in the thirteenth step S13, the cable modem 131 re-attempts to search the channel and simultaneously maintains the DSG mode (S14).

However, when the failure is determined not to be the PLL looking failure in the thirteenth step S13, the cable modem 131 determines whether or not the channel searching failure is a failure in synchronization between the CMTS and the cable modem 131 (S15).

When the failure is determined to be the failure in synchronization in the fifteenth step S15, the cable modem 131 re-attempts to search the channel and simultaneously maintains the DSG mode (S16).

In contrast, when the failure is determined not to be the failure in synchronization in the fifteenth step S15, the cable modem 131 determines whether or not the channel searching failure is a failure in receiving the DSG data (S17).

As a result of detecting the failure cause in the first step S1, when it is possible to receive the DSG data, the cable modem 131 recovers the DSG mode (S2).

However, as a result of detecting the failure cause in the first step S1, when it is impossible to receive the DSG data, the cable modem 131 performs the DOCSIS mode (S3).

The mode changing method in the digital broadcast receiver having the abovementioned configuration in accordance with a second embodiment of the present invention is described below.

If the DSG data is received from the CMTS while operating in the DOCSIS mode, the cable modem 131 performs the channel searching again (S31). When the cable modem 131 is changed into the DOCSIS mode as mentioned above, physical errors between the SI server or each server and the CMTS, such as the QAM looking failure, the PLL looking failure and the synchronization failure as stored in the database can be generated, and the DSG data can not be received from the SI server. Among these failures, the QAM looking failure, the PLL looking failure and the synchronization failure generated as the physical errors can be frequently generated during operation of the digital broadcast system.

Thus, in the case of the QAM looking failure, the PLL looking failure and the synchronization failure, it is possible to connect the SI server and the CMTS again. For this reason, the cable modem determines whether to receive the DSG data and re-attempts the DSG mode.

As mentioned above, according to the apparatus and method for changing the mode in the digital broadcast receiver according to the present invention, the change from the DOCSIS mode to the DSG mode is possible according to the state of the OpenCable digital broadcast receiver, and it is possible to improve capability of coping with a field.

Although exemplary embodiments of the present invention have been described, it will be understood by those skilled in the art that the present invention is not limited to the described exemplary embodiments. Rather, various changes and modifications can be made within the spirit and scope of the present invention, as defined by the following claims.

What is claimed is:

1. A method of changing modes in a digital broadcast receiver, the method comprising:
   channel searching to change a first mode into a second mode, and detecting a cause of a failure in securing a channel via a database upon failing to secure the channel in response to a user requesting a change of the second mode via a host; and
   recovering the second mode in response to detecting the cause of failure in securing a channel upon receiving Data over Cable Service Interface Specifications (DOCSIS) set-top box gateway data.

2. A method of changing modes in a digital broadcast receiver, the method comprising:
   channel searching to change from a Data over Cable Service Interface Specifications (DOCSIS) mode into a DOCSIS Set-top box Gateway (DSG) mode, and detecting a cause of a failure in securing a channel via a database upon failing to secure the channel in response to a user requesting a change of mode via a host; and
   recovering the DSG mode as a result of detecting the failure in securing a channel upon receiving DSG data.

3. The method of claim 2, further comprising remaining in the DOCSIS mode as a result of detecting the failure in securing a channel upon not receiving DSG data.

4. The method of claim 2, wherein channel searching to change from a Data over Cable Service Interface Specifications (DOCSIS) mode into a DOCSIS Set-top box Gateway (DSG) mode, and detecting a cause of a failure in securing a channel via a database upon failing to secure the channel in response to a user requesting a change of mode via a host comprises:
   determining whether or not the failure is a Quadrature Amplitude Modulation (QAM) looking failure; and re-attempting the channel searching and simultaneously maintaining the DSG mode upon a determination that the failure is the QAM looking failure.

5. The method of claim 4, further comprising:
determining whether or not the failure is a Phase Locked Loop (PLL) looking failure upon a determination that the failure is not the QAM looking failure; and
re-attempting the channel searching and simultaneously maintaining the DSG mode upon a determination that the failure is the PLL looking failure.

6. The method of claim 5, further comprising:
determining whether or not the failure is a failure of synchronization between a Cable Modem Termination System (CMTS) and a cable modem upon a determination that the failure is not the PLL looking failure; and
re-attempting the channel searching and simultaneously maintaining the DSG mode upon a determination that the failure is the synchronization failure.

7. The method of claim 6, further comprising determining whether or not the failure is a failure in receiving the DSG data upon a determination that the failure is not the synchronization failure.

8. The method of claim 3, wherein remaining in the DOCSIS mode as a result of detecting the failure in securing a channel upon not receiving DSG data comprises performing the channel searching again by a cable modem upon receiving the DSG data from a Cable Modem Termination System (CMTS) while operating in the DOCSIS mode.

9. A digital broadcast receiver in an OpenCable digital broadcast system, the digital broadcast receiver comprising:
a cable modem searching upstream and downstream channels of a Cable Modem Termination System (CMTS) upon a user requesting a change of mode via a host, and determining whether to receive Data over Cable Service Interface Specifications (DOCSIS) set-top box gateway data in a first mode to change into one of first and second modes according to whether or not securing the channels has succeeded.

10. A digital broadcast receiver in an OpenCable digital broadcast system, the digital broadcast receiver comprising:
a cable modem searching upstream and downstream channels of a Cable Modem Termination System (CMTS) upon a user requesting a change of a Data over Cable Service Interface Specifications (DOCSIS) Set-top box Gateway (DSG) mode via a host, and determining whether to receive DSG data in a DOCSIS mode to change into one of DSG and DOCSIS modes according to whether or not securing the channels has succeeded.

11. The digital broadcast receiver of claim 10, wherein the cable modem comprises:
a channel searcher searching the upstream and downstream channels of the CMTS upon the user requesting the change of mode via the host; and
a mode changer determining whether to receive the DSG data in the DOCSIS mode, and changing into the DSG mode upon the channel searcher succeeding in securing the channels, and change changing into the DOCSIS mode upon the channel searcher failing to secure the channels.

12. The digital broadcast receiver of claim 10, further comprising a database storing conditions of failing to search the channels in accordance with the channel searching failure of the channel searcher.

13. The digital broadcast receiver of claim 11, wherein the mode changer comprises:
a detector detecting a factor of failing to secure the channels via a database upon failing to secure the channels in the DOCSIS mode; and
a recover re-attempting channel searching and simultaneously maintaining the DSG mode upon the factor of failing to secure the channels being a physical factor, and maintaining the DOCSIS mode upon the DSG data not being received.

14. The digital broadcast receiver of claim 10, further comprising an address register registering a Media Access Control (MAC) address with the CMTS upon the DSG mode being recovered via the recover.

15. An OpenCable digital broadcast system, comprising:
a Cable Modem Termination System (CMTS) receiving Data over Cable Service Interface Specifications (DOCSIS) Set-top box Gateway (DSG) data from one of a service information server and a conditional access server and to transmitting the DSG data;
a cable modem determining, upon failing to secure a channel of the CMTS, whether or not the DSG data has been received and performing a DOCSIS mode only upon the DSG data not being received, and performing a DSG mode upon the DSG data being received after failing to secure the channel of the CMTS; and
multiple DSG channels each having a broadcast head end receiving, creating and re-transmitting programs from a digital broadcast server via a network in the DSG mode.

* * * * *